(12) United States Patent
Bertorelle (10) Patent No.: US 11,012,859 B2
(45) Date of Patent: May 18, 2021

(54) SECURE BOOT AND SOFTWARE UPGRADE OF A DEVICE

(71) Applicant: Sequans Communications S.A., Colombes (FR)

(72) Inventor: Jerome Bertorelle, Colombes (FR)

(73) Assignee: SEQUANS COMMUNICATIONS S.A., Colombes (FR)

( * ) Notice: Subject to any disclaimer, the term of this patent is extended or adjusted under 35 U.S.C. 154(b) by 24 days.

(21) Appl. No.: 15/638,294

(22) Filed: Jun. 29, 2017

(65) Prior Publication Data

US 2018/0004956 A1 Jan. 4, 2018

(30) Foreign Application Priority Data

Jun. 30, 2016 (EP) .................................... 16305818

(51) Int. Cl.
*G06F 11/30* (2006.01)
*G06F 12/14* (2006.01)
(Continued)

(52) U.S. Cl.
CPC .............. *H04W 12/08* (2013.01); *G06F 8/65* (2013.01); *G06F 21/57* (2013.01); *G06F 21/575* (2013.01);
(Continued)

(58) Field of Classification Search
CPC ........ G06F 21/50; G06F 21/575; G06F 21/57; G06F 21/645; G06F 8/65; H04W 4/50; H04W 4/001; H04W 12/08; H04L 67/34
(Continued)

(56) References Cited

U.S. PATENT DOCUMENTS

2005/0268084 A1* 12/2005 Adams ..................... G06F 8/65
713/2
2006/0047944 A1 3/2006 Kilian-Kehr
(Continued)

FOREIGN PATENT DOCUMENTS

EP 2 950 569 12/2015
WO WO 2013/152331 10/2013
(Continued)

OTHER PUBLICATIONS

EP Search Report for EP Application No. 15305818.3, entitled: Secure Boot and Software Upgrade of a Device, dated Dec. 19, 2016.

*Primary Examiner* — Kendall Dolly
*Assistant Examiner* — Kevin Ayala
(74) *Attorney, Agent, or Firm* — Hamilton, Brook, Smith & Reynolds, P.C.

(57) ABSTRACT

A method of securely resetting a first device comprising a UICC, the method comprising providing a secure reset control application to a secure element of the UICC of the first device wherein the secure reset control application is capable of commanding the UICC to provide notification indicative of a secure reset of the first device being requested if a corresponding signal is received from a remote management server; and/or communication between the secure reset control application and a remote management server cannot be established for a predetermined period of time and upon the next first device reset, determine whether a secure reset has been requested.

16 Claims, 3 Drawing Sheets

(51) Int. Cl.
*H04W 12/08* (2021.01)
*H04W 4/50* (2018.01)
*H04L 29/08* (2006.01)
*H04L 29/06* (2006.01)
*G06F 8/65* (2018.01)
*G06F 21/57* (2013.01)
*G06F 21/50* (2013.01)
*G06F 21/64* (2013.01)

(52) U.S. Cl.
CPC .......... *H04L 63/0853* (2013.01); *H04L 63/20* (2013.01); *H04L 67/34* (2013.01); *H04W 4/50* (2018.02); *G06F 21/50* (2013.01); *G06F 21/645* (2013.01)

(58) Field of Classification Search
USPC .......................................................... 713/189
See application file for complete search history.

(56) References Cited

U.S. PATENT DOCUMENTS

| | | | | |
|---|---|---|---|---|
| 2010/0103995 A1* | 4/2010 | Seo | ....................... | H04L 5/1438 375/222 |
| 2011/0003580 A1* | 1/2011 | Belrose | ................... | G06F 21/34 455/410 |
| 2012/0084545 A1 | 4/2012 | Farina et al. | | |
| 2012/0108202 A1* | 5/2012 | Zhou | ....................... | H04M 1/67 455/410 |
| 2014/0044265 A1* | 2/2014 | Kocher | ................... | H04L 9/083 380/277 |
| 2014/0298322 A1* | 10/2014 | Gargiulo | ................... | G06F 8/61 717/175 |
| 2015/0106456 A1* | 4/2015 | van Hoek | ............... | H04L 67/14 709/206 |
| 2015/0220742 A1* | 8/2015 | Ouyang | ................... | G06F 21/32 713/189 |
| 2015/0242851 A1* | 8/2015 | Wall | ....................... | H04W 12/04 705/71 |
| 2016/0182512 A1* | 6/2016 | Chastain | ............... | H04W 12/06 713/170 |
| 2016/0378691 A1* | 12/2016 | Sherman | ................... | G06F 3/06 711/163 |

FOREIGN PATENT DOCUMENTS

| WO | WO 2015/102944 | 7/2015 |
|---|---|---|
| WO | WO 2006/038082 | 4/2016 |

\* cited by examiner

SECURE BOOT AND SOFTWARE UPGRADE OF A DEVICE

RELATED APPLICATION

This application claims priority under 35 U.S.C. § 119 or 365 to EP Application No. 16305818.3, filed Jun. 30, 2016. The entire teachings of the above application are incorporated herein by reference.

BACKGROUND

Security is a critical aspect of devices such as Internet of things (IoT) devices, where the hacking of a remote IoT device may have privacy, safety and financial consequences. Security concerns with IoT devices are one barrier to their more widespread adoption.

IoT devices are, owing to their relative simplicity, cost sensitive, and improved security typically has an impact on device cost. There is therefore, a strong need to provide good security at the lowest implementation cost possible.

For low cost devices such as IoT devices, guaranteeing that a large body of software (for example device firmware or operating system) is free of any security weakness for example a bug, hack or exploitable element is not practical, and so an important part of security is to be able to recover from a security breach after the security breach has been discovered. This usually involves being able to upgrade the device software, for example firmware or operating system, with a new version where the security weakness has been fixed. In the context of a large scale IoT deployment, and to be cost effective, this upgrade is preferably carried out fully remotely, without human intervention.

Many security schemes rely at some point on an embedded Secure Element (SE) running on the device, the SE being able to provide security services from a hardened enclave inside the system. Even if part of the device software is hacked, the SE software will not be compromised and can be relied upon to perform a secure software upgrade.

Software Attacks and Mitigation

Security attacks against a device can be classified as:
1. Physical attacks
2. Remote attacks Physical attacks where access to low-level components of the device system is gained have their own specific mitigation techniques. This disclosure addresses a limited subset of physical attacks where the attacker takes control of a local interface allowing interactions with the device system, for example a local console over a serial port. This disclosure also addresses remote attacks. The addressed attacks are referred to as "software attacks" herein as they rely on the attacker subverting normal protocol exchanges with the device to trigger and abuse software bugs, either over a network connection (remote) or a local interface (physical).

A software attack may leverage one of several weaknesses in a protocol supported by the device to either crash the device, or lead it to execute attack code. A common example is a buffer overflow in a protocol implementation, where some input data can become executed as code. This opens the door to arbitrary code execution on the device. The compromised device can then be exploited by subverting its normal functions, or by using it for unrelated functions. Owing to the fact that a software attack can be fully automated, such an attack can be scaled to a large number of devices. When a software weakness is found, all the devices running the affected software version are capable of being remotely compromised. Once "owned", even a very limited device can be used for harmful purposes like participating into a distributed denial of service (DDoS).

In a DDoS, a large number of compromised devices are typically used to flood internet servers, overloading them and making the associated service unavailable to regular users for the duration of the attack. The threat of a DDoS attack can be used, for example, to extort money from service providers. The large number of IoT devices deployed in the field makes them an interesting vector for DDoS attacks.

The enabler for a software attack is software vulnerability. Any scheme that makes the software more robust will help to prevent an attack, but in the end the last line of defence if a weakness is found and exploited will be to perform a remote software upgrade to install a fixed software version, for example fixed firmware or device operating system. As would be understood, this is a reactive mechanism and as such cannot prevent exploits, but it can limit the span of time during which a weakness can be abused. With millions or even billions of devices deployed, some in hard to reach locations, such a remote software upgrade is an important function.

For a software weakness to be exploitable, the device must be interacting with an untasted and possibly hostile external entity. As long as the device only interacts with trusted external entities, there is no risk of being subverted.

WO2006038082 discloses "System and method for safe booting electronic devices" where a system to remotely boot a cellular device is shown. However it is assumed that the cellular stack is trusted and cannot be tampered with. US20060047944 discloses "Secure booting of a computing device" and US20120084545 discloses "Methods and systems for implementing a secure boot device using cryptographically secure communications across unsecured networks". But like WO2006038082, these systems require the presence of a secure element driving the process and having a secure connection to the network.

There is therefore a need to provide greater surety over which entities a device communicates with, especially immediately after a reset (at boot time) to provide enhanced security of software against attacks.

SUMMARY

This disclosure relates to securely booting a device utilizing a secure element within the device to check for malicious attacks on the security of the device. It is particularly suitable for, but by no means limited to, secure boot of a mobile device using the secure element of a standard UICC (universal integrated circuit card).

According to a first aspect there is provided a method of securely resetting a first device comprising a UICC as defined in claim 1 of the appended claims.

The method comprising providing a secure reset control application to a secure element of the UICC of the first device wherein the secure reset control application is capable of commanding the UICC to provide notification indicative of a secure reset of the first device being requested if a corresponding signal is received from a remote management server; and/or communication between the secure reset control application and a remote management server cannot be established for a predetermined period of time and upon the next first device reset, determine whether a secure reset has been requested.

Optionally, providing notification indicative of a secure reset of the first device being requested comprises forcing a reset of the first device.

Optionally, the predetermined period of time is based on the normal operation of the first device.

Optionally, if a secure reset has been requested the first device operates in a lock down mode whereby communication with other devices is restricted and then communication with a software update server is established to determine whether a more recent version of first device software exists and then if a more recent version does exist, the more recent version is downloaded from the software update server and the integrity of the more recent version is verified.

Optionally, restricted communication with other devices comprises a reduction in communication with devices external to the first device compared to a normal mode of operation of the first device or no communication with devices external to the first device.

Optionally, the method further provides a secure module of the first device, the secure module being different to the secure element and being configured to provide the notification indicative of a secure reset.

Optionally, the secure module comprises a proxy function.

Optionally, the notification comprises at least one of a message from the secure reset control application and providing an output on an output pin controllable by the secure element.

Optionally, the secure module comprises a configuration interface to configure the proxy function and wherein configuration of the proxy function is one time programmable after each reset of the first device.

Optionally, the secure module is integrated onto a die of the first device.

Optionally, the secure module is configured to communicate with the secure reset control application to receive the notification that a secure reset is requested from the secure reset control application.

Optionally, the communication between the secure module and the secure reset control application comprises a polling scheme whereby a request is sent to the secure reset control application to determine whether a secure reset is required or a secure reset is not required.

Optionally, the communication between the secure module and the secure reset control application comprises a piggyback scheme whereby the secure reset control application provides notification that a reset is requested by way of modifying an existing message between the secure element and another entity of the first device.

Optionally, the notification comprises an indication of either the entire first device needing to be reset, or a subset of devices of the first device needing to be reset.

Optionally, the UICC comprises a standard UICC.

Optionally, the UICC comprises a proprietary UICC wherein an additional output pin is provided on the proprietary UICC for the notification.

Optionally, the secure module comprises a standard UICC interface to allow communication between the UICC and a modem module of the first device.

Optionally, the proxy function comprises a UICC proxy function.

According to a second aspect there is provided a first device comprising a UICC and a secure reset control application on a secure element of the UICC of the first device as defined in claim 15.

According to a third aspect there is provided a computer readable medium as defined in claim 16.

With all the aspects, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

Overview

This disclosure involves utilization of the secure element of a UICC to provide remote secure boot and software upgrade for a device comprising a UICC and associated modem function, for example a device comprising a cellular system such as LTE, 2G or 3G.

In known devices, the UICC protects the user subscription credentials and some operator data, but does not protect the reset of the device against hacking. In particular, the UICC has no way to control the device main software upgrade, and cannot reset the rest of the system.

In this disclosure, existing device components are used together with an optional hardware function added to the modem component of the device or to the UICC. In particular, there is no need to add a complex secure element to the modem component.

In overview, when a device is started by a reset, the device starts in 'lock down mode' (described later) and a secure element of a UICC of the device determines whether a secure reset has been requested.

If a secure reset has been requested, the device continues to operate in lock down mode and a check is performed as to whether a more recent version of a software image for the device is available. When a more recent version is available, it is downloaded, authenticity and integrity checked and if correct, the software will be upgraded and the system reset. If no acceptable more recent version is available, the software will start the device in normal mode. If a secure reset has not been requested, the software will allow the device to operate in normal mode.

In embodiments comprising a standard UICC, an optional UICC proxy function, is responsible for receiving a secure reset request from a UICC secure reset control application, and possibly for triggering a secure reset directly if the UPFF detects a lack of cellular modem requests in a timely manner (indicating a DoS) and a piggy-backing implementation is chosen.

A UICC secure reset control application is responsible for connecting to a remote server, and triggering a secure reset when ordered, or when it detects a DoS and is responsible for DoS protection.

Wherever UICC or SIM are referred to herein, the terms embedded UICC (eUICC) or embedded SIM (eSIM) are equally applicable.

DETAILED DESCRIPTION

Certain terms are now defined in the context of the disclosure.

Secure Boot

Secure boot is a feature guaranteeing that a device will only run authenticated and integrity protected software.

In a typical implementation, a software image undergoes a secure hashing algorithm, like SHA256 for example. This generates a cryptographically secure fingerprint of the software image. This fingerprint or hash code is itself signed using a public/private cryptographic scheme, for example RSA, using a secret private key. This authentication process happens when the software image is generated, in a secure facility, for example by the device manufacturer. The signed fingerprint is then attached to the software image to form a signed software image, which can then be stored on the device either at manufacturing time or later on through a software upgrade.

The process to generate a signed software image can be summarised as an on the device verification process that will:

Compute a cryptographically secure fingerprint Fc of the software image part of the signed software image, in the same manner as for the authentication process when the software image was originally generated.

Extract the signed fingerprint Fs from the signed software image, and verify its signature using a public key stored on the device in a read-only memory.

The signed software image is valid if and only if the signed fingerprint is valid, guaranteeing that the signed fingerprint has been generated by an authorized party (for example the device manufacturer, vendor or one of its providers), and Fc and Fs have the same value, guaranteeing that the software content has not been tampered with.

The fingerprint signature makes generating a valid signed fingerprint impossible for an attacker, as this can only be done by an entity having access to the protected private key. The secure hash makes it impossible to generate a software image matching an existing signed fingerprint. Both combined, this prevents a third party from generating a valid software package that will be accepted by the device.

The software package validity is verified during a software upgrade process, but it is also verified at boot time—hence the name "secure boot". On start-up, the device will execute a trusted bootloader from a tamper proof read-only memory, typically embedded on die in a system on chip (SoC) controlling the device. This secure bootloader will verify the software package to run as described above, and will only run a valid package.

In addition to a fingerprint, the software image may include other authenticated information. For example, it is important for software upgrades that the software version can be authenticated. This enables a software upgrade scheme to make sure that only a more recent version can be installed on a device, and prevent a class of attack where a hacker installs a genuine but older version with known security issues in order to compromise the device.

Without a secure boot mechanism, an attack compromising device software could become persistent by modifying the device software package in persistent memory (typically Flash memory). With secure boot, this becomes impossible. A reset of the device will always guarantee that the device will restart from a valid software image. Of course, this image may have known security weaknesses but just after boot it will be in a pristine state.

Lockdown Mode

Just after secure boot, the software stack of the device is guaranteed to be genuine and uncompromised. To become compromised through a software attack, the software stack must interact with an untasted external element. This interaction can happen either through a physical interface of the device (a serial port for example), or a remote connection using any network protocol. Such interactions with untasted external entities are typically required as part of the normal operation of a device, otherwise software attacks would not be a concern in the first place. It is possible to prevent interactions with untasted external entities, or at least limit them to the minimum, for a duration in order to limit the vulnerability of the system. Such a restricted mode of operation is referred to as "lock down mode". Lock down is used after secure boot, when the software is uncompromised.

Preferably, while in lock down mode the device will not have any interaction with untasted entities. This completely prevents the possibility of being compromised through a software attack. In practice, however, this may not be possible. For example, when an LTE connection is established, the device first starts to exchange messages with an unauthenticated eNB (evolved node B, the 3GPP term for a LTE base station). Only in a second step is the network authenticated and the connection secured—and the UE will not proceed if the network is not properly authenticated. This creates an opportunity for a fake LTE eNB to compromise an LTE device by sending corrupted messages to the UE during the unauthenticated initial phase of the connection.

As would be understood, security is not absolute; it is always a trade-off between risk and cost of protection. It may take several techniques to secure a system: in the above example of an LTE device, the handling of the early LTE unauthenticated messages will require specific protection techniques.

When operating in lock down mode, security is increased by limiting exchanges with untasted entities. The lock down need not be perfect, and how much risk to take in this phase is context and application dependent.

Secure Element

Securing a large enough body of software in a cost effective way is not possible in practice with the current state of the art. A complex piece of software is likely to contain bugs that can be exploited to compromise the device running this software. However, in order to be able to recover a compromised device remotely, it is necessary to have a trusted function running on the device.

A common way to implement this trusted function is to include a secure element (SE) inside the device. The SE runs a separate software stack, fully isolated from the main body of software as would be understood. The SE software is typically more limited in size and scope, and is developed using safer but more costly software development techniques. To make the per device cost acceptable, a SE software stack can be reused over many different devices.

The SE provides a last line of defence: if the device's main body of software becomes compromised, the SE software will remain unaffected and can still be trusted. Further, the SE also has some level of control on the reset of the device.

Figure 1:
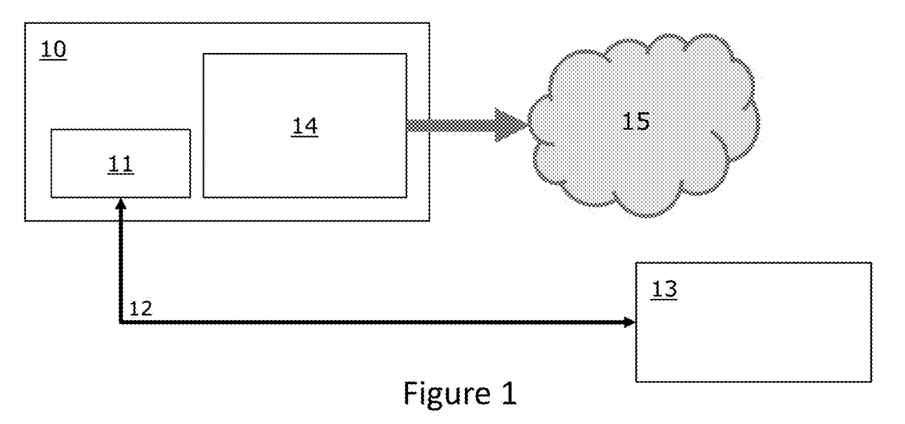
FIG. 1 illustrates a PC or laptop comprising a secure element and a separate connection to a remote server.

As illustrated in FIG. 1 as an example, in a PC or laptop 10, an SE 11 can have its own direct network access 12 to interact with a remote server 13, which may be a management server. In this case even if the operating system 14 of the main PC has been compromised, the remote server 13 can connect directly to the SE 11 to reset the PC and have the SE perform a software upgrade (if needed) or a complete reinstallation. Direct connection 12 is separate to the network 15 that PC 10 normally connects to.

Figure 2:
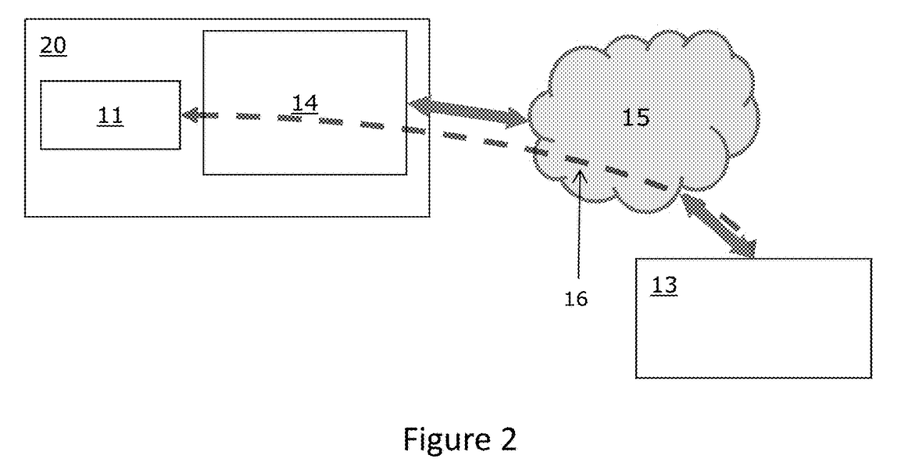
FIG. 2 illustrates a cellular device comprising a secure element and a connection to a remote server through a modem of the device.

As illustrated in FIG. 2, in the case of a cellular device 20 such as an IoT device, the connection 16 to a remote server 13 to perform a software upgrade has to go through the cellular stack of the cellular device, as it is the only connectivity available. However, a cellular modem of the cellular stack is too large and complex to guarantee it cannot be exploited. This means that a secure element would have to communicate to the management server 13 through a possibly compromised software function 14.

Communicating through a compromised function adds complexity which requires protection against "Man in the middle" (MITM) attacks, where an adverse intermediate node may intercept and modify exchanges between two parties, and against a form of denial of service (DoS) where the compromised software may simply block communication exchanges between the SE 11 and management server 13 or selectively drop exchanged data.

Protecting communications against MITM attacks requires both mutual authentication, where the SE 11 authenticates the remote server 13 and the remote server authenticate the SE, as well as integrity protection of exchanged messages. There are known techniques to perform this, for example using TLS for the traffic associated to an EAP method (EAP-TLS, EAP-AKA . . . ) for mutual authentication. Such techniques prevent modification to the data exchanged between device and remote (management) server by an attacker such as the selective dropping of packet, as dropped packets will be retransmitted and if they continue to fail, the communication session will eventually end with an error which would foil such an attack.

To protect against the compromised software 14 blocking communications, "keep alive" exchanges can be sent between SE 11 and server 13. That is to say that regular message exchanges between SE 11 and server 13 can be sent to make sure that no more than a predetermined duration D can occur between exchanges. If no exchange happens for a duration longer than D, the SE 11 can deduce that a form of message interception is in place, and therefore consider itself under attack.

Figure 3:
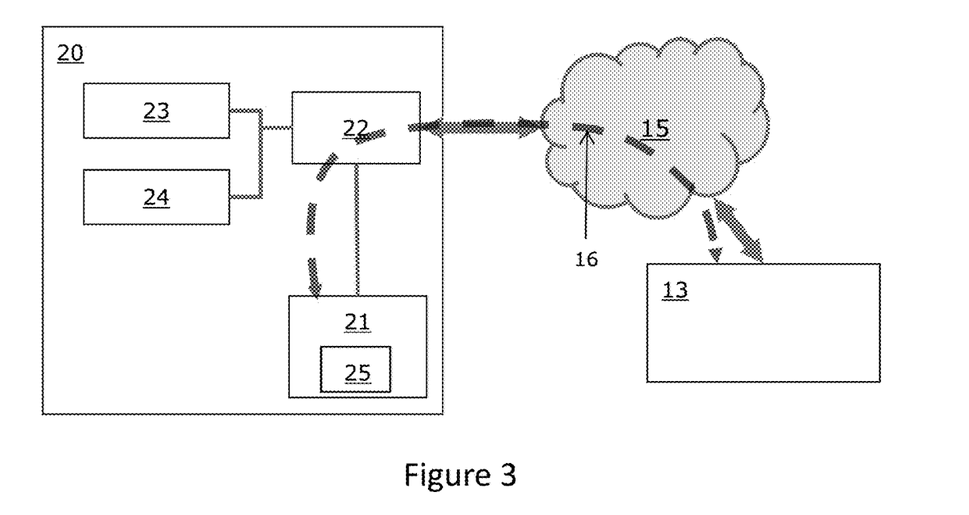
FIG. 3 illustrates a cellular device comprising a UICC comprising a secure element and a connection to a remote server through a modem of the device according to an embodiment.

Illustrated in FIG. 3 is the device of FIG. 2 with additional detail.

UICC

The security of 3GPP cellular systems, such as device 20, is based upon a Universal Integrated Circuit Card (UICC) 21, commonly called a "SIM card", on the device. The UICC may be a separate card using a known interface, or it may be integrated within device 20. The UICC securely contains the user subscription information, and a secret used to derive authentication and cryptographic keys to support secure exchanges between the device and various services in the network.

The UICC comprises an embedded a secure element 25. However this SE only controls the UICC itself, and has no control on the external modem 22 of the cellular device 20. The UICC is a slave to the modem. The request/response protocol used between the modem and the UICC (see 3GPP TS 31.101) defines that the UICC 21 can only respond to a request initiated by the modem. The modem also controls the power supply and clock of the UICC (not shown).

Although the UICC 21 is a slave to the modem, it is able to run applications on its SE 25. Using the Card Application Toolkit (CAT) specification (3GPP TS 31.111), commonly called "SIM Toolkit" or STK, it is possible for an application running on a UICC 21:

To interact with the modem 22, and in particular request services from the modem, such as initiating a communication channel 16 with a server 13 in the network 15 that the device communicates with.

To interact with a service on the network side in a secure way, with mutual authentication between the STK application running on the UICC 21 and the remote service 13, as well as encryption of the data exchanged.

The standard STK framework also allows an operator to securely install or upgrade applications on the UICC 21. Such applications then run on the UICC SE 25, in a tamper proof secure environment, and can interact with the external entities through STK services offered by the modem 22. However, the UICC 21 depends on the modem 22 properly implementing those services, which cannot be guaranteed if the modem software itself has been compromised.

In known systems, a secure element would be required inside the modem 22 (in addition to the UICC 21 secure element 25) or a permanent secure connection with the UICC, which would require trusting the modem software at all times.

As disclosed herein, the SE 25 of the UICC 21 is able to support a secure remote controlled software upgrade process, with minimal cost impact on the device i.e. manufacturing impact, real estate impact, additional device and software impact. This secure software upgrade covers the cellular modem software, but may also be extended to external chips and sub-systems in the device 20 (function 1 (23) to function N (24) in FIG. 3). The disclosed system and method does not require an additional secure element inside modem 22, and does not need to assume the integrity of modem or other software at all times.

Figure 4:
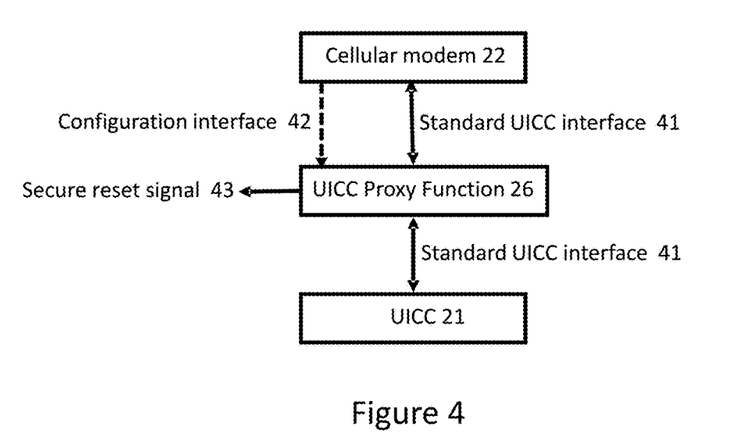
FIG. 4 illustrates a UICC proxy function according to an embodiment.

The present disclosure may be implemented on the device 20 of FIG. 3 and comprises a secure reset control application running on the embedded secure element 25 of UICC 21, a secure reset and software check indication function, for each process unit in the system, and an optional UICC Proxy Function (UPF)—see FIG. 4, to support standard compliant UICC cards but optional if the device 20 comprises an integrated (soldered or hard-wired) UICC with proprietary extensions.

The commonly named "SIM Toolkit" (STK) system enables a cellular telecommunication operator to deploy applications running on the secure element embedded in the UICC of a cellular device (see the 3GPP TS 31.111 and ETSI TS 102.223 specifications). These applications can be remotely updated, and can securely connect to remote management servers 13 through the modem 22 by using the modem STK support functionality.

A secure reset control application is installed on a cellular device 20, such as an IoT device that is capable of providing notification of a secure reset of the device being requested if 1) instructed to by a remote management server 13 and/or 2) when no communication to a remote management server 13 can be established for a predetermined period of time.

The first case may be utilised when a security weakness has been discovered in a class of similar devices, and a fixed (and hence more secure) software image is available for the device. A remote management server 13 can send a command to the UICC secure reset control application to force a reset and software upgrade as soon as the command is received. This minimizes the duration for which a device will run software (for example a modem 22 software stack) with known vulnerabilities.

The second case may be utilised to protect the device against a denial of service (DoS), where compromised software prevents communication between the remote server 13 and secure reset control application. The conditions under which a DoS is detected are implemented in software in the secure reset control application in the UICC 21. They could be adjusted and configured differently depending on the type of device 20 and/or device application. For example, the predetermined period of time, D, necessary to trigger a reset may be adjusted based on the device 20 activity pattern. Certain devices will be dormant most of the time and only wake-up infrequently, and will therefore preferably need a longer delay, D than other always on devices.

Upon instruction of the secure reset control application, providing notification indicative of a secure reset of device 20 being requested may comprise a proprietary UICC 21, typically integrated on the device 20 and not removable, comprising at least one additional output signal over standard UICC pinout, which may output the notification indicative of a secure reset being required, and may also be coupled to the other programmable units/chips/devices of device 20. Such an embodiment comprises a UICC 21 and its secure element 25 being integrated on the same die as the modem SoC.

In order for the provide notification that a secure reset is required when device 20 comprises a standard UICC 21 supporting only the standard connectivity as discussed in FIG. 2, an optional secure module is provided in device 20, which may be considered to be a UICC proxy function 26 (see later and FIG. 4).

As well as providing notification that a secure reset of device 20 is required, the notification may indicate that a subset of devices of the device 20 maybe required to be reset securely.

Notification indicative of a secure reset being required (for example the cause of the reset being a security event related to a secure upgrade being required) is detectable upon the next reset of the device 20 or subset of devices within device 20. Such detection may comprise interrogating a data flag stored in an associated memory accessible by the secure element 25, for example a flag in a specific hardware register for example a "boot cause" register, to indicate the cause of the boot in order to differentiate between a cold boot or a wake-up from very deep sleep or a reset due to some system fault for example. A 'secure reset' could be an additional type of indicator and/or flag to add to a "boot cause" register.

Other detection could comprise any device of device 20 comprising a reset control i/o pin and/or other programmable i/o pin. An embedded SoC of device 20 including a processor can support such a function.

In order to support secure reset as disclosed herein, any securely resettable device 20 or subset of device 20 preferably supports secure reset as described earlier in the secure boot section.

When notification indicative of a secure reset of device 20 or a subset of devices of device 20 is provided by the secure reset control application, a secure reset signal is output from either a proprietary UICC of device 20 or from a standard UICC and optional proxy function 26 (see below and FIG. 4) of device 20.

Figure 5:
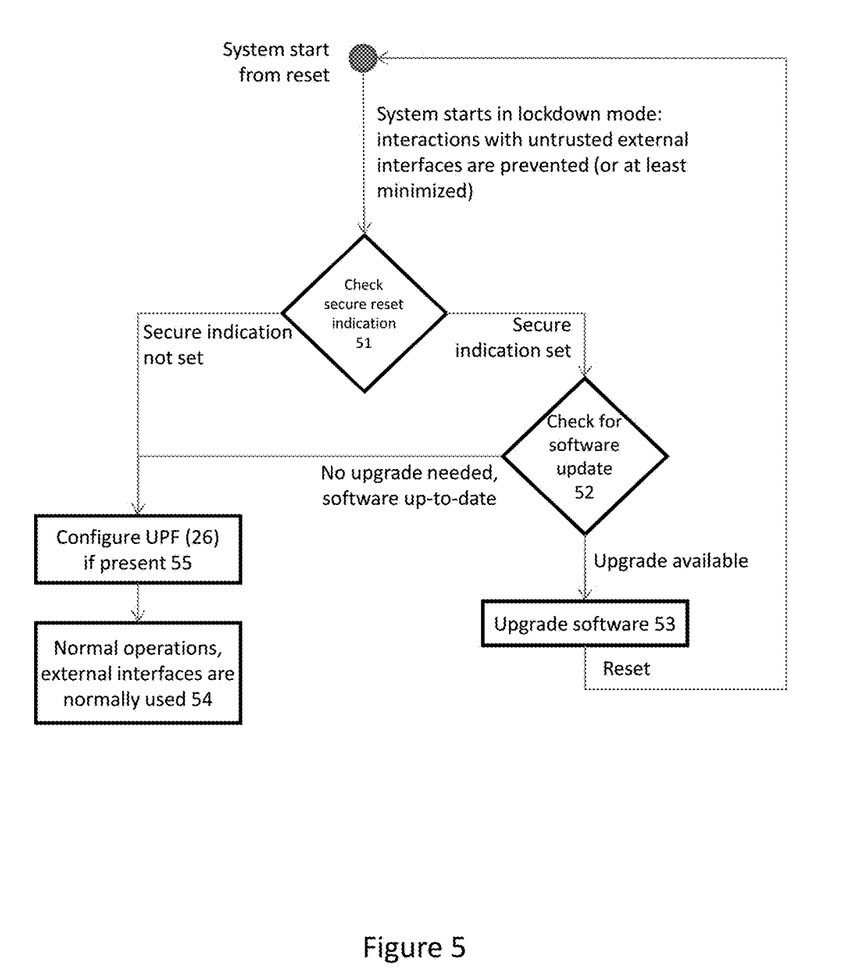
FIG. 5 illustrates a secure reset method according to an embodiment.

As illustrated in FIG. 5 and on command of an appropriate processing unit of device 20, after a reset, a device 20 or each subset device of device 20, capable of being securely reset, operates in lock down mode and checks 51 whether notification indicative of a secure reset being required is present (whether a secure reset has been requested) before enabling any external interface to an untasted entity. If the secure reset indication is set, it is assumed that a software attack occurred, or at least it may have occurred, and continues to operate in lock down mode. A request is made 52 that the modem 22 contacts a software upgrade server while avoiding interaction, or at least minimizing interactions, with any untasted external entity—any such interaction comes with the risk of having the software compromised before completing the secure software update.

By contacting a software upgrade server before enabling untasted interfaces, the processing unit can be instructed to download a newer software image including security fixes before being compromised again.

If a more recent software version is not available, the processing unit proceeds to normal operations at step 54. If a more recent software version is available, the processing unit downloads the software image 53, checks its integrity (using the same process as a secure boot) and if the image is genuine, installs it and performs a further reset. Upon recovery from the next reset, the processing unit is guaranteed to run the most recent known software including the most recent security fixes.

Upon the next reset, step 51 is carried out again, if no secure reset indication is present (the processing unit is running the most recent software version), then it can proceed to a normal operational state and fully enable external interfaces to untasted entities as per step 54.

When a processing unit is securely reset, it should be able to trust all the other device components required to contact a remote software upgrade server, which is to say that all other processing units should run authenticated and uncompromised software images. This can be easily guaranteed by doing a secure reset of all processing units in the system, which is simple and as such safe, or at least all the other units needed to perform a secure upgrade of the processing unit(s) which may have software vulnerabilities.

As described previously, the interface between a standard UICC and a cellular modem 22 is well defined and limited: the UICC is a slave, it can only run when the modem enables it, and can only reply to the modem requests.

In an embodiment when device 20 comprises a standard UICC, the STK allows the UICC 21 to piggy-back an STK request to its response to communications from the modem 22, and the STK defines a list of services that the modem will provide to the UICC and its applications. Therefore, a UICC application, such as the disclosed secure reset control application, can establish a communication link 16 with a remote server 13 for example. The list of known services is well defined, and does not include triggering a secure reset for secure software upgrade.

With a standard UICC, therefore, there is a need to extend the UICC interface to allow it to provide notification that a secure reset of the modem and possibly other processing units in the device is required.

On the modem 22, the STK services are implemented as part of the modem software stack, and may be compromised by an attack. The secure reset function cannot therefore be reliably implemented by such potentially compromised software, as compromised software could disable the secure reset feature to protect itself against such a reset. Handling of the secure reset order must therefore be handled by a secure module, immune to hacking.

Such a secure module may comprise a proxy function such as a UICC Proxy Function (UPF) which is capable of providing secure reset control to the UICC secure reset control application, in a way that cannot be tampered with by any other compromised software, such as software of modem 22.

As illustrated in FIG. 4, the secure module (UPF) 26 is preferably positioned between the UICC 21 and the cellular modem 22.

In a typical implementation, the UPF 26 may be integrated on the modem SoC die. Alternatively, UPF 26 may be implemented on a discrete programmable component connected to both the UICC (using a master SIM card interface) and the modem (using a slave SIM card interface). This component would comprise at least one output pin to trigger the reset of the modem and indicate a security condition. Such a component could be a small micro-controller, PLD or FPGA for example. For cost purposes, integrating the UPF on die is preferable as the UPF has low complexity compared to, for example, an LTE modem, once integrated on die.

The UPF 26 is capable of taking control of the UICC interface 41, but provide access to the UICC 21 in a standard and transparent way to the cellular modem 22. The cellular UICC management function may be unaware of the presence of UPF 26.

The UPF 26 comprises a configuration interface 42 typically coupled to modem 22 as shown in FIG. 4. The following is described in relation to configuration interface 42 being coupled to modem 22 although interface 42 may be coupled to any other function in device 20 rather than modem 22, or, could be implemented on any cellular (mobile) device comprising several processing units, each running its own separate software image.

Configuration interface 42 allows configuration of the UPF 26, for example with a predetermined duration for DoS detection (see below), and also the enabling of the UPF 26. Preferably, the configuration of UPF 26 is not reversible i.e. once configured and enabled, the UPF cannot be disabled and its configuration cannot be changed. The cellular modem 22, by way of interface 42, can configure and enable the UPF just after each reset (step 55 of FIG. 5), while in lock down mode and before commencing normal interaction with untasted external entities (step 54 of FIG. 5). After step 54, the modem 22 software is genuine and not compromised and this guarantees that the UPF will be properly configured and enabled.

If the modem software subsequently becomes compromised, it will not be able to disable or alter the UPF 26 behaviour as the UPF is a one-time programmable function. Once enabled, the UPF will continue to operate securely.

Once configured, the UPF 26 is able to:

Enable the UICC secure reset control application to provide notification indicative of a secure reset being requested (by way of secure reset signal 43), and to provide an appropriate indication to other subsystems in the device if required.

To protect against denial of service attacks, where a compromised modem 22 software would stop talking to the UICC 21.

Such functionality can be achieved by way of two different classes of scheme:

1. "Polling" schemes, where the UPF 26 injects a request command to allow the secure reset control application running on the UICC 21 to respond.

2. "Piggy-back" schemes, where existing UICC responses to unrelated requests from modem 22 are modified to add information related to the secure reset function.

The two schemes may be used in parallel. An infrequent polling scheme can be complemented by an opportunistic piggy-back usage to let the UICC secure reset control application provide a reset command faster, without having to wait for the next poll.

For each class, many variants are possible. Certain examples are described below:

1. Polling Scheme

In a polling scheme, the UPF 26 will issue a request or requests specific to the secure reset application to the UICC 21, and process the UICC responses. If the cellular modem 22 issues its own request while a UPF request is on-going, the modem request will be blocked and delayed until the UICC 21 responds to the UPF request, and then the cellular modem request will proceed. This can add latency to the cellular modem requests, but the 3GPP standard UICC usage is not latency sensitive and is not disrupted by such infrequent UPF requests/responses.

There are many ways to format such requests from the UPF to the UICC. In a first alternative, a UICC request may start with a class byte (CLA in [ISOSC], on which ETSI TS 102.221 and 3GPP TS 31.101 are based) and reserve a range of values for proprietary classes i.e. any CLA value with its most significant bit set and different from 0xFF can be used.

A second alternative is to use a specific Toolkit Application Reference (TAR) application id for the UPF requests to the UICC. There is a standard registry to identify card toolkit application, see ETSI TS 101.220. A given application is defined by a 3 byte value, see section 6 of ETSI TS 101.220. For example, STK applications have the range B2 00 00 to B2 00 FF reserved. A specific range is used for proprietary toolkit applications (BF FF 00 to BF FF FF). Any TAR in this range could be used to exchange data between the UPF 26 and UICC secure reset control application without interfering with other 3GPP exchanges between the UICC 21 and the modem 22. The UPF 26 may be configured with the TAR value to use and send and expect specific requests and responses.

As a third alternative, the cellular modem 22 may establish a bearer independent protocol (BIP) local link dedicated to the UICC secure reset control application, and let the UPF 26 use it as needed after configuring the UPF with the logical channel to use for communications. This facility is part of the STK framework (see 3GPP TS 31.111) and enables the creation of a channel to send arbitrary data between an entity external to the UICC 21 and an UICC application. This is normally done through the cellular modem 22, but the same framework can be used to let the UPF 26 exchange data with the UICC secure reset application. The UPF 26 in this case would need to use the proper STK message format, as specified in 3GPP TS 31.111.

There are other ways to define messages between UPF 26 and UICC 21 that will not interfere with existing cellular modem 22 functions. When sending such a response, the UICC 21 should be given a chance to respond.

The useful information in the response may be a choice between two actions:

Do nothing—the most common case

Perform a secure reset

In the latter case, as described herein, the scheme can be extended to identify a specific device (function) or set of devices (functions) to securely reset. Typically, a global device 20 secure reset is sufficient and preferable in relation to security and the robustness against attack that it provides.

Any polling scheme also provides a protection against DoS because the UPF 26 will regularly send requests to the UICC on its own, even if the cellular modem 22 software is compromised and stops interacting with the UICC 21. The UICC secure reset control application will, in turn, still receive the UPF messages and be given a chance to respond. The UICC can provide notification indicative of a secure reset being requested if it is unable to communicate with an external server (for example remote server 13 which may be a management or control server) for longer than a predetermined time.

The UPF 26 would be configured with details of the polling rate to be applied during the lock down configuration step as previously described.

2. Piggy-Back Scheme

In a piggy-back scheme, a secure reset order (notification indicative of a secure reset being requested) is provided to the UPF 26 by the UICC secure reset control application by modifying existing response messages to the modem 22.

In one embodiment, an existing response status is modified. Any response message contains a two bytes status. For example the value 0x9000 indicates a normal status, while values starting with 6 indicate errors (the exact value provides more information on the error type). Other ranges are reserved. The UICC secure reset control application may trigger a secure reset (providing notification indicative of a secure reset being requested) by replacing such value by a specific pre-configured invalid value known to the UPF 26, for example 0xA000. Alternatively any invalid value could trigger a secure reset.

An alternative piggy-back scheme is to add a configurable number of bytes to any response, for example a single byte. This byte may then indicate what action to perform, and be stripped by the UPF 26 when passing the response to the cellular modem 22—making this modification invisible to the modem.

Still alternatively, a variable number of bytes could be added, with the first byte providing information on the length added. This can be used to provide more information to the UPF 26 than just a global secure reset being requested, for example a list of subsystems or sub-devices of device 20 to securely reset.

When using a piggy-back scheme, the UPF 26 should also provide protection against DoS. As the secure reset indication is piggy-backed on a response to a cellular modem 22 request, if the cellular modem fails to send requests then the UICC secure reset control application cannot directly trigger a secure reset. To protect against this possibility, the UPF 26 (by way of the secure reset control application) preferably checks for regular requests from the cellular modem 22, and triggers a secure reset if no requests have been sent to the UICC 21 for longer than a predetermined period. As mentioned previously, this DoS protection can be configured on the UPF 26 by the cellular modem 22 during the initial UPF configuration (step 55), while the cellular modem is in lock down mode.

The UPF 26 and additional secure reset signal provision, for example an additional i/o pin, may be integrated into a cellular modem 22 SoC with negligible impact on the die size and device hardware cost. In particular, their cost is much lower than adding another secure element in each processing unit. Therefore, this described solution can provide a low cost secure reset and software upgrade functionality.

This disclosure leverages as much as possible existing 3GPP standards (UICC and STK features mainly), so benefits from all the associated proven processes and security work. Security is, hence, maintained in a cost-effective manner.

The goal of the system and method disclosed herein is to guarantee that the software running on a remote 3GPP cellular device (for example device 20) supporting a UICC can always be upgraded, even if the current version has been compromised.

The described methods may be implemented by a computer program. The computer program comprises computer-executable instructions or code arranged to instruct or cause a computer or processor to perform one or more functions of the described methods. The computer program may be provided to an apparatus, such as a computer, on a computer readable medium or computer program product. The computer readable medium or computer program product may comprise non-transitory media such as a semiconductor or solid state memory, magnetic tape, a removable computer memory stick or diskette, a random access memory (RAM), a read-only memory (ROM), a rigid magnetic disc, and an optical disk, such as a CD-ROM, CD-R/W, DVD or Blu-ray. The computer readable medium or computer program product may comprise a transmission signal or medium for data transmission, for example for downloading the computer program over the Internet.

The invention claimed is:

1. A method of securely resetting a first device comprising a universal integrated circuit card, UICC, and a modem, the method comprising:
providing a secure reset control application to a secure element of the UICC of the first device; and
providing a secure module of the first device, the secure module being different to the secure element, the secure module being positioned between the UICC and the modem, wherein
the secure reset control application is capable of commanding the UICC to provide to the modem notification indicative of a secure reset of the first device being requested when:
a corresponding signal is received from a remote management server; and/or
communication between the secure reset control application and a remote management server cannot be established for a predetermined period of time;
wherein the secure module is configured to provide the notification indicative of a secure reset; and
upon a next first device reset, determine whether a secure reset has been requested;
wherein the secure module is configured to communicate with the secure reset control application to receive the notification that a secure reset is requested from the secure reset control application and the communication between the secure module and the secure reset control application comprises a piggyback scheme whereby the secure reset control application provides notification that a reset is requested by way of modifying an existing message between the secure element and another entity of the first device.

2. The method of claim 1 wherein providing notification indicative of a secure reset of the first device being requested comprises forcing a reset of the first device.

3. The method of claim 1 wherein the predetermined period of time is based on the normal operation of the first device.

4. The method of claim 1 further comprising:
if a secure reset has been requested the first device operates in a lockdown mode whereby communication with other devices is restricted; and then
communication with a software update server is established to determine whether a more recent version of first device software exists; and then
if a more recent version does exist, the more recent version is downloaded from the software update server and the integrity of the more recent version is verified.

5. The method of claim 4 wherein restricted communication with other devices comprises:
a reduction in communication with devices external to the first device compared to a normal mode of operation of the first device; or
no communication with devices external to the first device.

6. The method of claim 1 wherein the secure module comprises a proxy function.

7. The method of claim 1 wherein the notification comprises at least one of:
a message from the secure reset control application;
providing an output on an output pin controllable by the secure element.

8. The method of claim 6 wherein the secure module comprises a configuration interface to configure the proxy function and wherein configuration of the proxy function is one time programmable after each reset of the first device.

9. The method of claim 1 wherein the secure module is integrated onto a die of the first device.

10. The method of claim 1 wherein the piggyback scheme is used in parallel with a polling scheme whereby a request is sent to the secure reset control application to determine whether a secure reset is required or a secure reset is not required.

11. The method of claim 1 wherein the notification comprises an indication of either the entire first device needing to be reset, or a subset of devices of the first device needing to be reset.

12. The method of claim 1 wherein the UICC comprises a proprietary UICC wherein an additional output pin is provided on the proprietary UICC for the notification.

13. The method of claim 1 wherein the secure module comprises a standard UICC interface to allow communication between the UICC and a modem module of the first device.

14. The method of claim 6 wherein the proxy function comprises a UICC proxy function.

15. A first device comprising a modem, a UICC, a secure reset control application on a secure element of the UICC of the first device, and a secure module of the first device, the secure module being different to the secure element, the secure module being positioned between the UICC and the modem, wherein
the secure reset control application is capable of commanding the UICC to provide to the modem notification indicative of a secure reset of the first device being requested when:
a corresponding signal is received from a remote management server; and/or
communication between the secure reset control application and a remote management server cannot be established for a predetermined period of time;
wherein the secure module is configured to provide the notification indicative of a secure reset; and
upon a next first device reset, determine whether a secure reset has been requested;
wherein the secure module is configured to communicate with the secure reset control application to receive the notification that a secure reset is requested from the secure reset control application and the communication between the secure module and the secure reset control application comprises a piggyback scheme whereby the secure reset control application provides notification that a reset is requested by way of modifying an existing message between the secure element and another entity of the first device.

16. A non-transitory computer readable medium comprising instructions that when executed by a processor cause the processor to carry out a method of securely resetting a first device comprising a universal integrated circuit card, UICC, and a modem, the method comprising
providing a secure reset control application to a secure element of the UICC of the first device; and
providing a secure module of the first device, the secure module being different to the secure element, the secure module being positioned between the UICC and the modem, wherein
the secure reset control application is capable of commanding the UICC to provide to the modem notification indicative of a secure reset of the first device being requested when:
a corresponding signal is received from a remote management server; and/or
communication between the secure reset control application and a remote management server cannot be established for a predetermined period of time;
wherein the secure module is configured to provide the notification indicative of a secure reset; and
upon a next first device reset, determine whether a secure reset has been requested;
wherein the secure module is configured to communicate with the secure reset control application to receive the notification that a secure reset is requested from the secure reset control application and the communication between the secure module and the secure reset control application comprises a piggyback scheme whereby the secure reset control application provides notification that a reset is requested by way of modifying an existing message between the secure element and another entity of the first device.

* * * * *